(No Model.)
J. S. FIELD.
ART OF MAKING ICE TONGS.
No. 491,540. Patented Feb. 14, 1893.
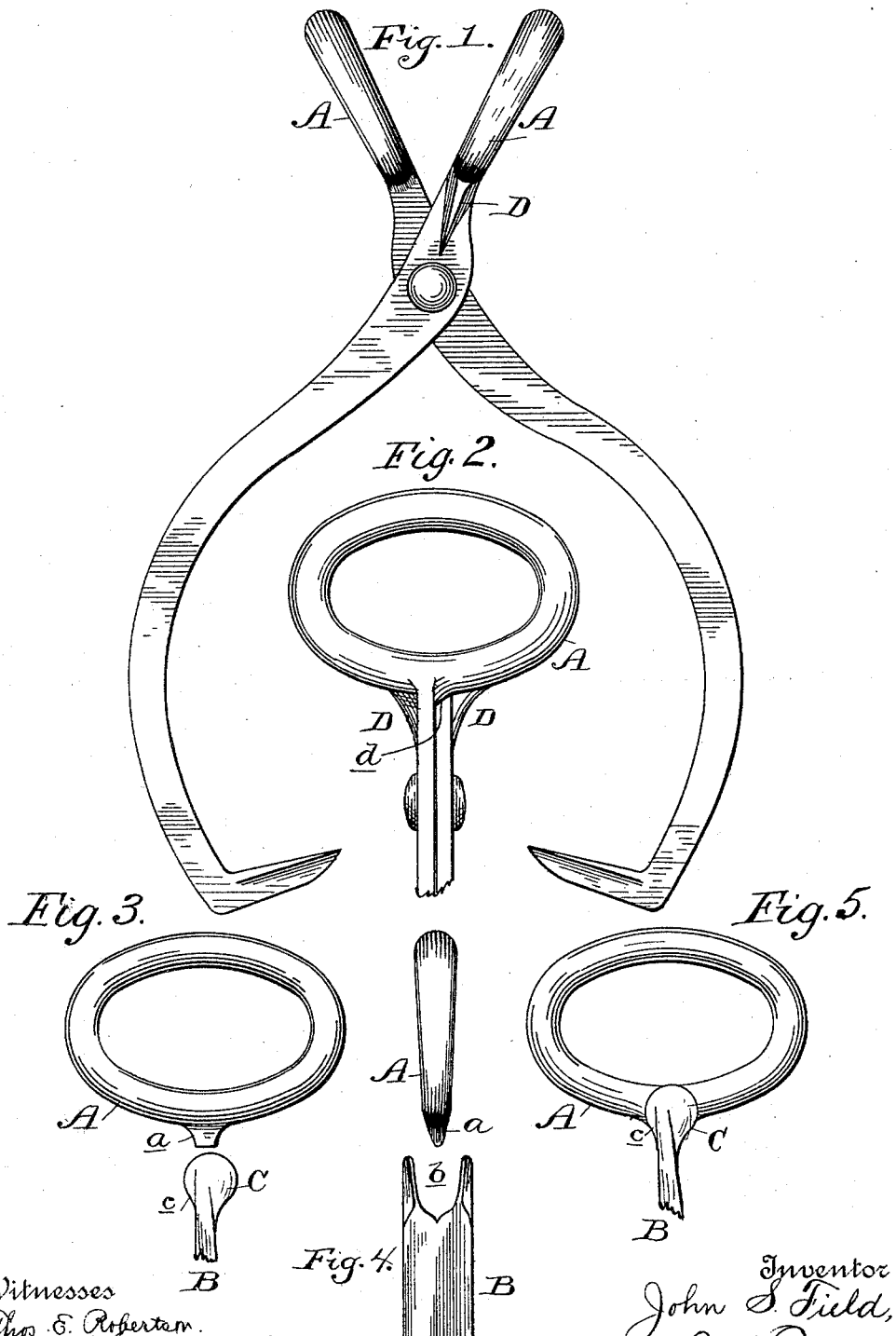
Witnesses
Thos. E. Robertson.
W. E. Clendaniel.
Inventor
John S. Field,
By F. J. W. Robertson.
Attorney

UNITED STATES PATENT OFFICE.

JOHN S. FIELD, OF CHICAGO, ILLINOIS.

ART OF MAKING ICE-TONGS.

SPECIFICATION forming part of Letters Patent No. 491,540, dated February 14, 1893.

Application filed June 9, 1892. Serial No. 436,115. (No specimens.)

*To all whom it may concern:*

Be it known that I, JOHN S. FIELD, a citizen of the United States of America, residing at Chicago, in the county of Cook, Illinois, have invented certain new and useful Improvements in Processes of Making Ice-Tongs, of which the following is a specification, reference being had therein to the accompanying drawings.

This invention is designed to provide an ice tongs of wrought metal having a brace or braces at the junction of the handles with the body of the tongs.

In carrying out my invention I form the handles and shanks separately and then unite them in the manner hereinafter described and then definitely claimed.

In the accompanying drawings—Figure 1 is a side elevation of my tongs as produced by my process. Fig. 2 shows the handles and the upper part of the shanks at right angles to the position shown in Fig. 1. Figs. 3 and 4 show the parts, before they are united, in different positions. Fig. 5 shows the parts in position for welding.

In carrying out my process I make the handles in the form of oval rings A having a projecting teat $a$ (see Figs. 3 and 4). The upper ends of the shanks B are split as shown at $b$ (Fig. 4) and widened at each side to form projections C and $c$ (Fig. 3). The parts are now brought to a welding heat and the ring or handle set in the split part of the shank as shown in Fig. 5 and are then forged to the shape shown in Figs. 1 and 2, either by hand or by the aid of dies and steam hammers, as may be found most convenient to the makers. By this process a brace D is formed at the junction of the handle and shank which very much strengthens the tongs, making them much more durable and avoiding the loss of many pairs of tongs which results from the old mode of making.

Although I show two braces to each handle, viz: a large one D on the outside and a smaller one $d$ on the inside of the same, I do not limit myself to the use of two braces, but may in some cases provide each handle with the larger or outer brace D only. In this case there will be no projections $c$ formed on the shank.

What I claim as new is:

The process of uniting the handle to the shank of a pair of tongs herein described, which consists in forming the handle in the form of a ring, slitting the top of the shank, forming projections $c$ on the side, then uniting the two at a welding heat and forming the said projections into a brace at the junction of the handle and shank, substantially as described.

In testimony whereof I affix my signature, in presence of two witnesses, this 4th day of June, 1892.

JOHN S. FIELD.

Witnesses:
JAMES O. HEYWORTH,
W. WILLIAMSON.